United States Patent [19]

Chiang

[11] Patent Number: 5,447,398

[45] Date of Patent: Sep. 5, 1995

[54] FIXING MEANS

[76] Inventor: Chih-Chung Chiang, No. 493, Tzu-Kuan Rd., Tzu-Kuan Hsiang, Kaohsiung Hsien, Taiwan

[21] Appl. No.: 194,957

[22] Filed: Feb. 14, 1994

[51] Int. Cl.$^6$ .................. F16B 37/08; F16B 39/12
[52] U.S. Cl. .................... 411/237; 411/269; 411/433; 411/937.2
[58] Field of Search ............ 411/237, 263, 222, 223, 411/307, 432, 433, 917, 924, 269, 937.2

[56] References Cited

U.S. PATENT DOCUMENTS 5,248,232  9/1993  Chiang .

Primary Examiner—Neill R. Wilson
Attorney, Agent, or Firm—Lowe, Price, LeBlanc & Becker

[57] ABSTRACT

A nut includes a first half having a short shank with an internal screw thread therethrough and an external screw thread thereon and a second half with a threaded bore. The internal screw thread of the first half has a first pitch while the external screw thread has a second screw pitch. The second screw pitch has constant first and second radii. The second radius is shorter than the first radius relative to an axis of the first half. The first screw pitch has constant third and fourth radii. The third radius is longer than the fourth radius relative to the axis of the first half. The third radius has a length at least equal to or longer than the second radius.

1 Claim, 2 Drawing Sheets

FIXING MEANS

BACKGROUND OF THE INVENTION

1. Field of the Invention

This invention relates to a fixing means, and more particularly to an improvement related to the nut and bolt set disclosed in U.S. Pat. No. 5,248,232, issued to the same invention on Sep. 28, 1993.

2. Description of the Related Art

According to the above cited U.S. patent, there is disclosed a nut and bolt set which includes a nut having two halves and a threaded bolt engageable with the two halves. The combination of the two halves together with the threaded bolt provides a locking mechanism which is difficult to remove or disassemble.

SUMMARY OF THE INVENTION

The main object of the present invention is to provide an improved structure at a first half of the nut so that a resilient abutting engagement can be enhanced by the improved structure at the first half.

According to this invention, a nut includes first and second halves. The first half has a short shank with an internal screw thread therethrough and an external screw thread thereon. The internal screw thread of the first half has a first screw pitch and is engageable with a threaded bolt, while the external screw thread has a second screw pitch different from the first screw pitch. The second half includes a threaded bore with first and second sections of differing radii, the second section being wider than the first section. The first section has a screw pitch equal to the first screw pitch. The second section of the second half has a third screw pitch. One of either of the third screw pitch of the second half and the second screw pitch on the short shank of the first half is finer than the other. The second section of the second half has a length which is slightly longer than short shank of the first half. The difference in screw pitches between the second section of the second half and the external screw thread on the short shank of the first half cooperatively provide a deformation of screw pitches when the two halves are locked together, thereby resulting in a firm and secure locking mechanism.

The external screw thread on the short shank of the first half is constructed so as to have constant first and second radii which cooperatively define a vertical length for the second screw pitch, the second radius being shorter than the first radius relative to an axis of the first half. The internal screw thread of the first half is constructed to have constant third and fourth radii which cooperatively define a vertical length for the first screw pitch, the third radius being longer than the fourth radius relative to the axis of the first half. The third radius is at least equal to the second radius so that a thickness between the first and second screw pitch is reduced. In the preferred embodiment, the third radius is greater than the second radius. The reduced thickness at the short shank of first half provides a resilient abutting force to counteract an axial compression stress of the second section of the second half, thereby creating an abutting engagement between the external screw thread of the first half and the internal screw thread in the second section of the second half when the first half is tightened relative to the second half after the two halves are tightened relative to the locking bolt which passes through an object.

BRIEF DESCRIPTION OF THE DRAWING

Other features and advantages of the present invention will become apparent in the following detailed description, including drawings, all of which show a non-limiting preferred embodiment of the present invention, and in which.

DETAILED DESCRIPTION OF THE PREFERRED EMBODIMENT

Figure 1:
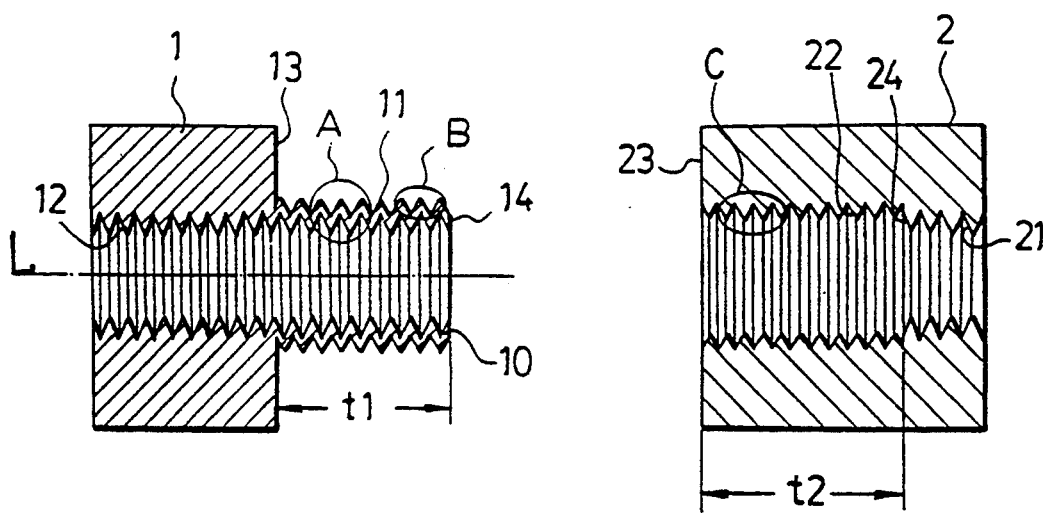
FIG. 1 shows cross-sectional views of the first and second halves of a nut of a fixing means of the present invention.
Figure 2:
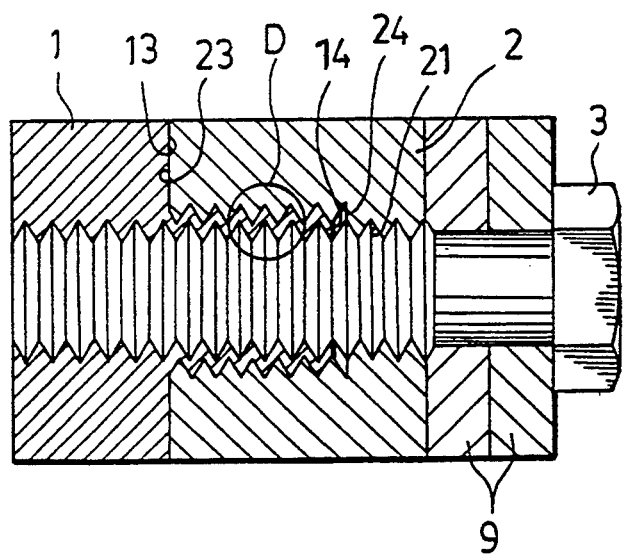
FIG. 2 shows a partially cross sectional view of a fixing means of the present invention when in use.

Referring to FIGS. 1 and 2, the fixing means of the present is shown to comprise a locking bolt 3 which has a threaded end that is threaded at a first screw pitch and a nut comprises first and a second halves 1, 2. The first half 1 has a short shank 10 with an internal screw thread 12 therethrough and an external screw thread 11 thereon. The internal screw thread 12 has the first screw pitch so that it can engage the locking bolt 3. The external screw thread 11 has a second screw pitch different from the first screw pitch.

The second half 2 includes a threaded bore with first and second sections 21, 22 of differing radii. The second section 22 is larger than the first section 21. The first section 21 of the second half 2 has a screw pitch equal to the first screw pitch of the internal screw thread 12 of the first half 1. The second section 22 of the second half 2 has a third screw pitch which is slightly finer than the second screw pitch of the first half 1 and a length which is slightly longer than the short shank of the first half 1.

Figure 4:
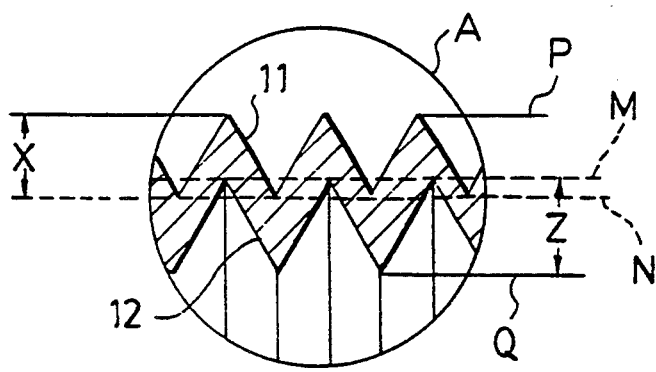
FIG. 4 illustrates an enlarged view of the encircled portion (A) found in FIG. 1.

As shown in FIG. 4, the external screw thread 11 on the short shank 10 of the first half 1 is constructed to have constant first and second radii which cooperatively define a vertical length "X" for the second screw pitch. The first radius is defined by a perpendicular length between the dotted line "P" and the axis "L" of the first half 1 (see FIG. 1), while the second radius is defined by a perpendicular length between the dotted line "N" and the axis "L" of the first half 1. The second radius is thus shorter than the first radius. The internal screw thread 12 of the first half 1 is constructed to have constant third and fourth radii which cooperatively define a vertical length "Z" for the first screw pitch. The third radius is defined by a perpendicular length between the dotted line "M" and the axis "L" of the first half 1, while the fourth radius is defined by a perpendicular length between the dotted line "Q" and the axis "L" of the first half 1. The third radius is thus longer than the fourth radius. In this embodiment, the third radius is greater than the second radius. Thus, a thickness between the first and second threads 11, 12 is accordingly reduced so that the tips of the first and second screw pitches closely overlap with one another.

Figure 3A:
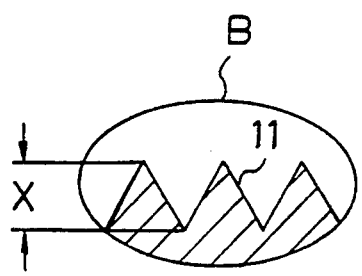
FIGS. 3(A) and 3(B) respectively show enlarged views of the encircled portions (B) and (C) found in FIG. 1.
Figure 3B:
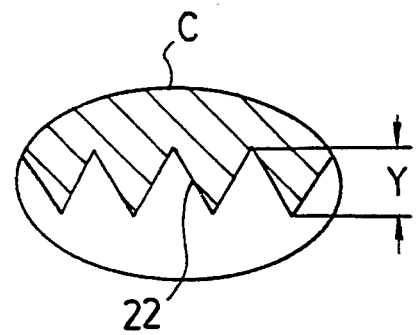

Referring to FIG. 3(B), the third screw pitch 22 of the second half 2 has a vertical length "Y" which is defined by constant fifth and sixth radii and which is shorter than the vertical length "X" of the second screw pitch of the first half 1. The second section 22 of the second half 2 has a horizontal length (t2) slightly longer than the horizontal length (t1) of the short shank 10 of the first half 1.

When in use, the first half 1 is threaded to the second half 2 and the whole assembly is threaded on a locking bolt 3 which passes through two objects 9 up to a certain tightness. Since the length (t2) of the second section of the second half 2 is longer than the length (t1) of the short shank 10 of the first half 1, no clearance is formed between two flat abutting faces 13, 23 of the two halves 1,2. However, a small clearance 24 is formed between a free end 14 of the short shank 10 of the first half 1 and the first section 21 of the second half 2, as shown in FIG. 2.

Figure 5:
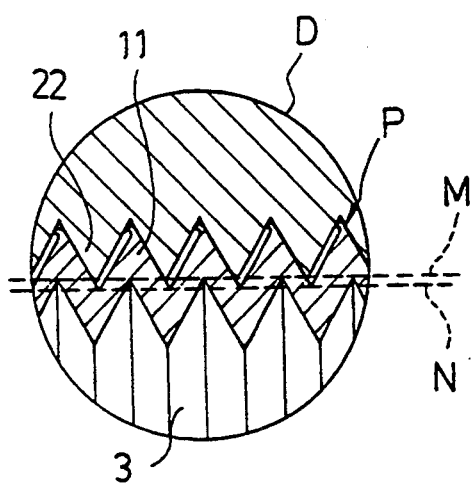
FIG. 5 is an enlarged view of the encircled portion (D) found in FIG. 2 to illustrate how the internal screw thread in second half and the external screw thread of the first half deform when the latter is tightened relative to the former.

Referring to FIGS. 2 and 5, in order to ensure a firmer locking, the first half 1 is turned further as the whole nut is turned in a clockwise direction relative to the second half 2. Due to the difference in the vertical lengths of the second and third screw pitches, deformation of the screw pitches occurs between the tips of the screw pitch of the internal screw thread of the second half 2 and the external screw pitch on the short shank 10 of the first half 1, as shown by "P" in FIG. 5. Axial tensile stress and compression stress are formed between the second and third screw pitches in addition to a radial compression force between the groove and crest of the threads 12, 22. The more the first half 1 is tightened, the more severe the deformation becomes, during which the external screw thread 11 of the first half 1 provides a resilient abutting force due to a reduction in the thickness of the shank 10 to counteract an axial compression stress of the second section 22 of the second half 2. Thus, an abutting engagement is formed between the external screw thread 11 on the short shank 10 of the first half 1 and the internal thread in the second section 22 of the second half 2. Therefore, the engagement provided when the nut of the present invention is in use is firmer than that disclosed in the cited U.S. Patent.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A fixing means comprising:

a bolt with a threaded end threaded at a first screw pitch; and a two-part nut member engaging threadedly with said threaded end (of said bolt), said nut member including a first half and a second half, said first half having a short shank with an internal screw thread therein and an external screw thread thereon, said internal screw thread of said first half having a first screw pitch and being engageable with said threaded end of said bolt, said external screw thread of said first half having a second screw pitch different from said first screw pitch, said internal and external threads being substantially concentric with one another;

said second half having a threaded bore with first and second sections of differing radii, said second section being wider than said first section, said first section of said second half having said first screw pitch and being engageable with said threaded end of said bolt, said second section of said second half having an internal screw thread with a third screw pitch which is engageable with said external screw thread of said first half and a length longer than said short shank of said first half, one of said second and third screw pitches being finer than the other wherein said external screw thread on said short shank of said first half is defined by substantially constant first and second radii, said second radius being shorter than said first radius relative to an axis of said first half, said internal screw thread of said first half being defined by substantially constant third and fourth radii, said third radius being longer than said fourth radius relative to said axis of said first half, and wherein the said third radius of said first screw pitch is at least equal to said second radius of said second screw pitch.

* * * * *